United States Patent
Waddleton et al.

(10) Patent No.: US 10,544,717 B2
(45) Date of Patent: Jan. 28, 2020

(54) SHARED OIL SYSTEM ARRANGEMENT FOR AN ENGINE COMPONENT AND A GENERATOR

(71) Applicant: PRATT & WHITNEY CANADA CORP., Longueuil (CA)

(72) Inventors: David Waddleton, Candiac (CA); Daniel Matthew McGuire, Montreal (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 318 days.

(21) Appl. No.: 15/418,932

(22) Filed: Jan. 30, 2017

(65) Prior Publication Data

US 2018/0066552 A1    Mar. 8, 2018

Related U.S. Application Data

(60) Provisional application No. 62/384,442, filed on Sep. 7, 2016.

(51) Int. Cl.
*F01M 11/10* (2006.01)
*F01D 25/20* (2006.01)

(52) U.S. Cl.
CPC ............. *F01M 11/10* (2013.01); *F01D 25/20* (2013.01); *F05D 2220/32* (2013.01); *F05D 2260/98* (2013.01); *F16N 2250/00* (2013.01)

(58) Field of Classification Search
CPC . F16N 7/40; F16N 29/00; F16N 29/02; F16N 2250/00; F16N 2250/04; F16N 2250/08; F16N 2250/30; F01M 11/10
See application file for complete search history.

(56) References Cited

U.S. PATENT DOCUMENTS

| | | |
|---|---|---|
| 3,078,667 A | 2/1963 | Deinhardt |
| 3,080,716 A | 3/1963 | Cummings et al. |
| 3,147,823 A | 9/1964 | Killackey et al. |
| 3,300,965 A | 1/1967 | Sherlaw et al. |
| 3,512,610 A | 5/1970 | Hollingworth |
| 3,643,428 A | 2/1972 | Marshall et al. |
| 3,658,153 A | 4/1972 | Berman |

(Continued)

FOREIGN PATENT DOCUMENTS

| | | |
|---|---|---|
| CA | 1273212 C | 8/1990 |
| CA | 2273944 C | 7/2004 |

(Continued)

*Primary Examiner* — Minh Truong
(74) *Attorney, Agent, or Firm* — Norton Rose Fulbright Canada LLP

(57) ABSTRACT

A method of distributing oil to a component within a gas turbine engine includes directing a first oil flow from an oil source to an engine component and back to the oil source, directing a second oil flow from the oil source to a generator driven by the engine and back to the oil source, monitoring a parameter of the second oil flow downstream of the generator and upstream of the oil source, detecting a contaminant in the second oil flow based on the parameter, and reducing the second oil flow to the generator when the contaminant is detected without reducing the first oil flow to the engine component. A shared oil system for a component of a gas turbine engine and a generator driven by the gas turbine engine is also discussed.

9 Claims, 3 Drawing Sheets

(56) References Cited

U.S. PATENT DOCUMENTS

| | | | |
|---|---|---|---|
| 4,041,697 A | 8/1977 | Coffinberry et al. | |
| 4,151,710 A | 5/1979 | Griffin et al. | |
| 4,201,044 A | 5/1980 | Dodd | |
| 4,354,345 A | 10/1982 | Dreisbach, Jr. et al. | |
| 4,461,340 A | 7/1984 | Hart et al. | |
| 4,498,525 A | 2/1985 | Smith | |
| 4,696,156 A | 9/1987 | Burr et al. | |
| 4,705,100 A | 11/1987 | Black et al. | |
| 4,891,934 A | 1/1990 | Huelster | |
| 4,914,904 A | 4/1990 | Parnes et al. | |
| 4,934,140 A | 6/1990 | Dennison et al. | |
| 4,953,663 A | 9/1990 | Sugden | |
| 4,999,994 A | 3/1991 | Rüd et al. | |
| 5,189,929 A | 3/1993 | Chory | |
| 5,241,814 A | 9/1993 | Butler | |
| 5,318,151 A * | 6/1994 | Hood | F04C 29/021 184/6.1 |
| 5,438,823 A | 8/1995 | Loxley et al. | |
| 5,555,722 A | 9/1996 | Mehr-Ayin et al. | |
| 5,615,547 A | 4/1997 | Beutin et al. | |
| 6,000,210 A | 12/1999 | Negulescu | |
| 6,301,780 B1 | 10/2001 | Templeton | |
| 6,626,134 B1 | 9/2003 | Brinton | |
| 6,722,858 B2 | 4/2004 | Yoshimura et al. | |
| 6,912,895 B1 | 7/2005 | Jaeger | |
| 7,093,666 B2 | 8/2006 | Trumper | |
| 7,195,055 B1 | 3/2007 | Jaeger | |
| 7,208,854 B1 | 4/2007 | Saban et al. | |
| 7,364,117 B2 | 4/2008 | Dionne | |
| 7,442,239 B2 | 10/2008 | Armstrong et al. | |
| 7,687,928 B2 | 3/2010 | Taneja et al. | |
| 7,793,505 B2 | 9/2010 | Dooley | |
| 7,823,374 B2 | 11/2010 | Venkataramani et al. | |
| 7,886,544 B2 | 2/2011 | Koenig | |
| 7,886,875 B2 * | 2/2011 | Shevchencko | F01D 21/10 184/6.11 |
| 7,908,840 B2 | 3/2011 | Schwarz et al. | |
| 7,922,914 B1 * | 4/2011 | Verdegan | B01D 37/046 210/741 |
| 7,997,082 B2 | 8/2011 | Beardsley | |
| 8,136,355 B2 | 3/2012 | Yasuda et al. | |
| 8,257,024 B2 | 9/2012 | Phillips et al. | |
| 8,261,527 B1 | 9/2012 | Stearns et al. | |
| 8,276,359 B2 | 10/2012 | Bondarenko et al. | |
| 8,316,880 B2 | 11/2012 | Grosskopf et al. | |
| 8,485,222 B2 | 7/2013 | Restivo et al. | |
| 8,490,917 B2 | 7/2013 | Brooks et al. | |
| 8,572,970 B2 | 11/2013 | Matteson et al. | |
| 8,590,309 B2 | 11/2013 | Paradise | |
| 8,776,952 B2 | 7/2014 | Schwarz et al. | |
| 8,850,876 B2 | 10/2014 | Ertz et al. | |
| 8,869,940 B2 * | 10/2014 | Johnson | F16N 7/40 184/6.12 |
| 8,904,753 B2 | 12/2014 | Murphy | |
| 8,938,944 B2 | 1/2015 | Todorovic | |
| 9,038,391 B2 | 5/2015 | Lehar et al. | |
| 9,091,212 B2 | 7/2015 | Veilleux, Jr. et al. | |
| 9,097,169 B2 | 8/2015 | Logan et al. | |
| 9,114,877 B2 | 8/2015 | Weber et al. | |
| 9,217,367 B2 | 12/2015 | Sander et al. | |
| 9,217,374 B2 | 12/2015 | Beier | |
| 9,222,415 B2 | 12/2015 | Osorio | |
| 9,249,800 B2 | 2/2016 | Ballard et al. | |
| 9,341,080 B2 | 5/2016 | Phillips et al. | |
| 2002/0007982 A1 | 1/2002 | Howard | |
| 2004/0173341 A1 | 9/2004 | Moser et al. | |
| 2006/0081419 A1 * | 4/2006 | Care | F01D 25/20 184/6.11 |
| 2015/0292675 A1 * | 10/2015 | Schjott | F16N 29/00 184/6.4 |
| 2016/0003148 A1 | 1/2016 | Gameiro et al. | |
| 2016/0108819 A1 | 4/2016 | Dreher et al. | |
| 2016/0153326 A1 | 6/2016 | Muller et al. | |
| 2016/0207618 A1 | 7/2016 | Darrow, Jr. et al. | |
| 2016/0222885 A1 | 8/2016 | Roberts | |
| 2016/0298547 A1 | 10/2016 | Ripley et al. | |
| 2016/0326906 A1 | 11/2016 | Sheridan et al. | |
| 2016/0332743 A1 | 11/2016 | Teicholz et al. | |

FOREIGN PATENT DOCUMENTS

| | | |
|---|---|---|
| GB | 723261 A | 2/1955 |
| GB | 763448 A | 12/1956 |
| GB | 892857 A | 4/1962 |
| GB | 912762 A | 12/1962 |
| GB | 1374810 A | 11/1974 |
| GB | 1451815 A | 10/1976 |
| GB | 2533132 A | 6/2016 |
| GB | 2536803 A | 9/2016 |
| JP | 2860557 B2 | 2/1999 |
| JP | 2001303954 A | 10/2001 |
| JP | 2007074894 A | 3/2007 |
| WO | 2015116260 A1 | 8/2015 |
| WO | 2016018498 A1 | 2/2016 |

* cited by examiner

SHARED OIL SYSTEM ARRANGEMENT FOR AN ENGINE COMPONENT AND A GENERATOR

CROSS-REFERENCE TO RELATED APPLICATIONS

This application claims priority from provisional U.S. application No. 62/384,442 filed on Sep. 7, 2016, the entire contents of which are incorporated by reference herein.

TECHNICAL FIELD

The application relates generally to the cooling and lubrication of gas turbine engines and, more particularly, to a shared oil system for an engine component and a generator driven by the engine.

BACKGROUND OF THE ART

Gas turbine engines may drive generators for generating electrical power for aircraft use. These generators are generally air or oil cooled. For oil cooled generators, it can be preferential to integrate an oil system for the generator with an oil system for an engine component of the engine into a shared engine oil system. In the shared engine oil system, oil return lines from the generator and the engine component return the oil into the engine oil system. However, this arrangement may expose the engine oil system to contamination from the generator.

In some instances, large quantities of contaminant may be liberated from the generator and may damage the engine component. The contamination may also block a strainer installed in the oil return lines.

SUMMARY

In one aspect, there is provided a method of distributing oil within a gas turbine engine, the method comprising directing a first oil flow from an oil source to an engine component of the gas turbine engine and back to the oil source; directing a second oil flow from the oil source to a generator driven by the gas turbine engine and back to the oil source; monitoring a parameter of the second oil flow downstream of the generator and upstream of the oil source; detecting a contaminant in the second oil flow based on the parameter; and reducing the second oil flow to the generator without reducing the first oil flow to the engine component when the contaminant is detected.

In another aspect, there is provided a shared oil system for a component of a gas turbine engine and a generator driven by the gas turbine engine, the oil system comprising an oil source; a first oil circulation path defining a fluid communication from the oil source to the engine component and back to the oil source; a second oil circulation path defining a fluid communication from the oil source to the generator and back to the oil source, the first and second oil circulation paths being defined at least in part in parallel from the oil source to the engine component and from the oil source to the generator; at least one pump in fluid flow communication with the first and second oil circulation paths; a detector disposed in the second oil circulation path downstream of the generator and upstream of the oil source for measuring at least one parameter indicative of a contaminant in an oil flow exiting the generator; a valve disposed in the second oil circulation path upstream of the generator between the generator and the oil source, the valve operably connected to the detector and configured to be actuable upon detection of the contaminant by the detector.

In a further aspect, there is provided a shared oil system for a component of a gas turbine engine and a generator driven by the gas turbine engine, the oil system comprising an oil source; a first oil circulation path providing fluid communication between the engine component and the oil source; a second oil circulation path providing fluid communication between the generator and the oil source at least in part independently from the first oil circulation path; at least one pump in fluid communication with the first and second oil circulation paths; a detector configured to measure at least one parameter indicative of a contaminant in an oil flow in the second oil circulation path downstream of the generator and upstream of the oil source and to send a value indicative of the measurement; a valve disposed in the second oil circulation path upstream of the generator and downstream of the oil source, the valve being actuable by a command signal; and a control system operatively connected to the detector and the valve, the control system configured to compare the value indicative of the measurement with a corresponding threshold and to send the command signal to the valve when the value exceeds the corresponding threshold.

DESCRIPTION OF THE DRAWINGS

Reference is now made to the accompanying figures in which.

DETAILED DESCRIPTION

Figure 1:
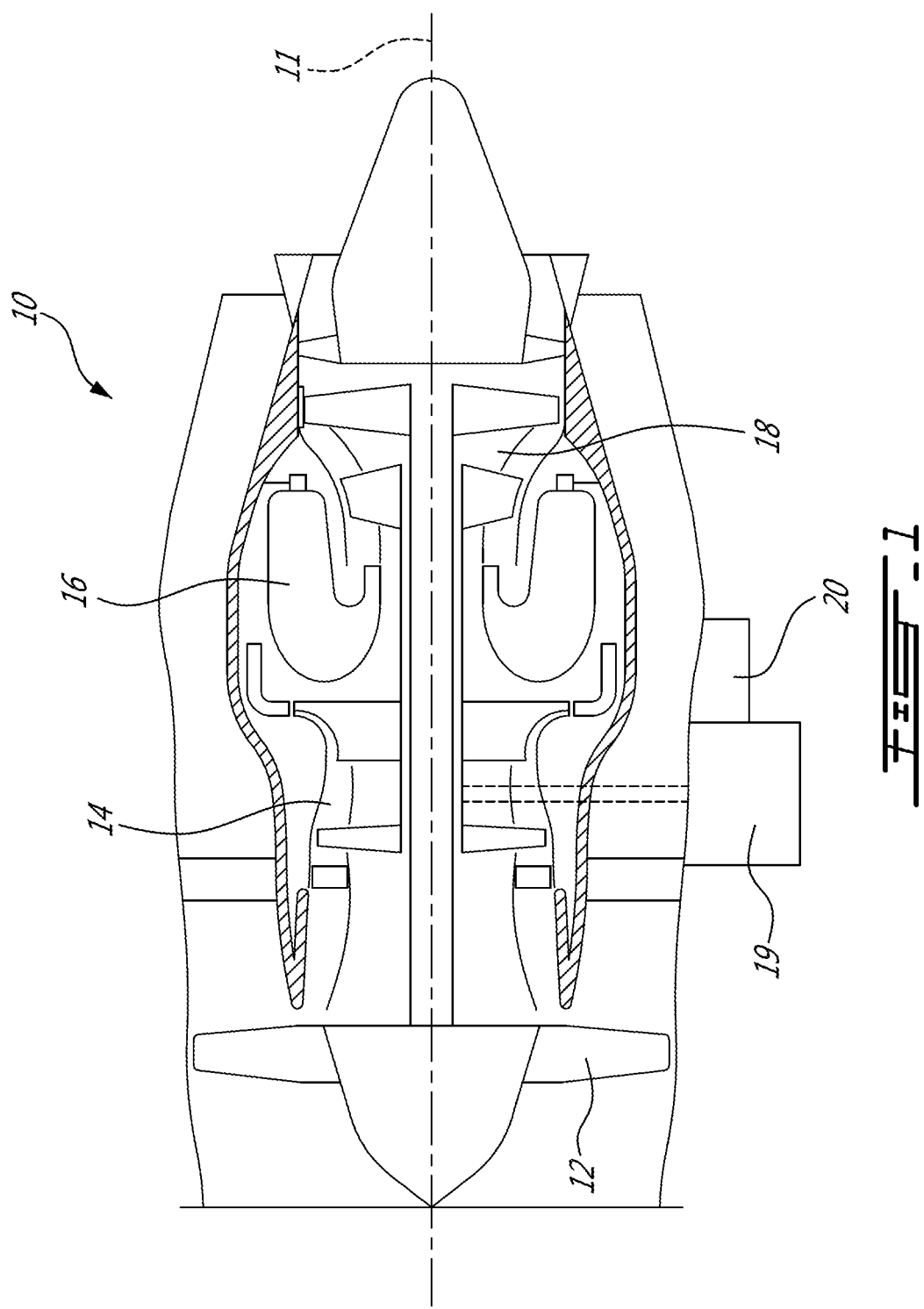
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine engine 10 includes several components that require cooling and/or lubrication, including, but not limited to, bearings, gears, seals, and the like. In the embodiment shown, one of these components is a reduction gearbox 19. The gearbox 19 includes a fluid circuit (not shown), for example an oil circuit, for cooling and/or lubricating parts of the gearbox 19 such as bearing chambers. The fluid circuit can also be used for sealing purposes. In the embodiment shown, the gearbox 19 is provided as a reduction gearbox.

Although shown as a turbofan engine, it is understood that the engine 10 can alternately be any other suitable type of engine, including, but not limited to, a turboprop or a turboshaft engine.

An electrical generator 20 is driven by the gas turbine engine 10 for providing electrical power to the airframe (not shown). The generator 20 is mounted to the gas turbine engine 10 and includes a fluid circuit (not shown), for example an oil circuit, for cooling and/or lubricating parts of the generator 20. In certain cases, for example if the generator starts to malfunction, the generator 20 may liberate contaminants and/or debris such as metal chips in the oil circuit.

Figure 2:
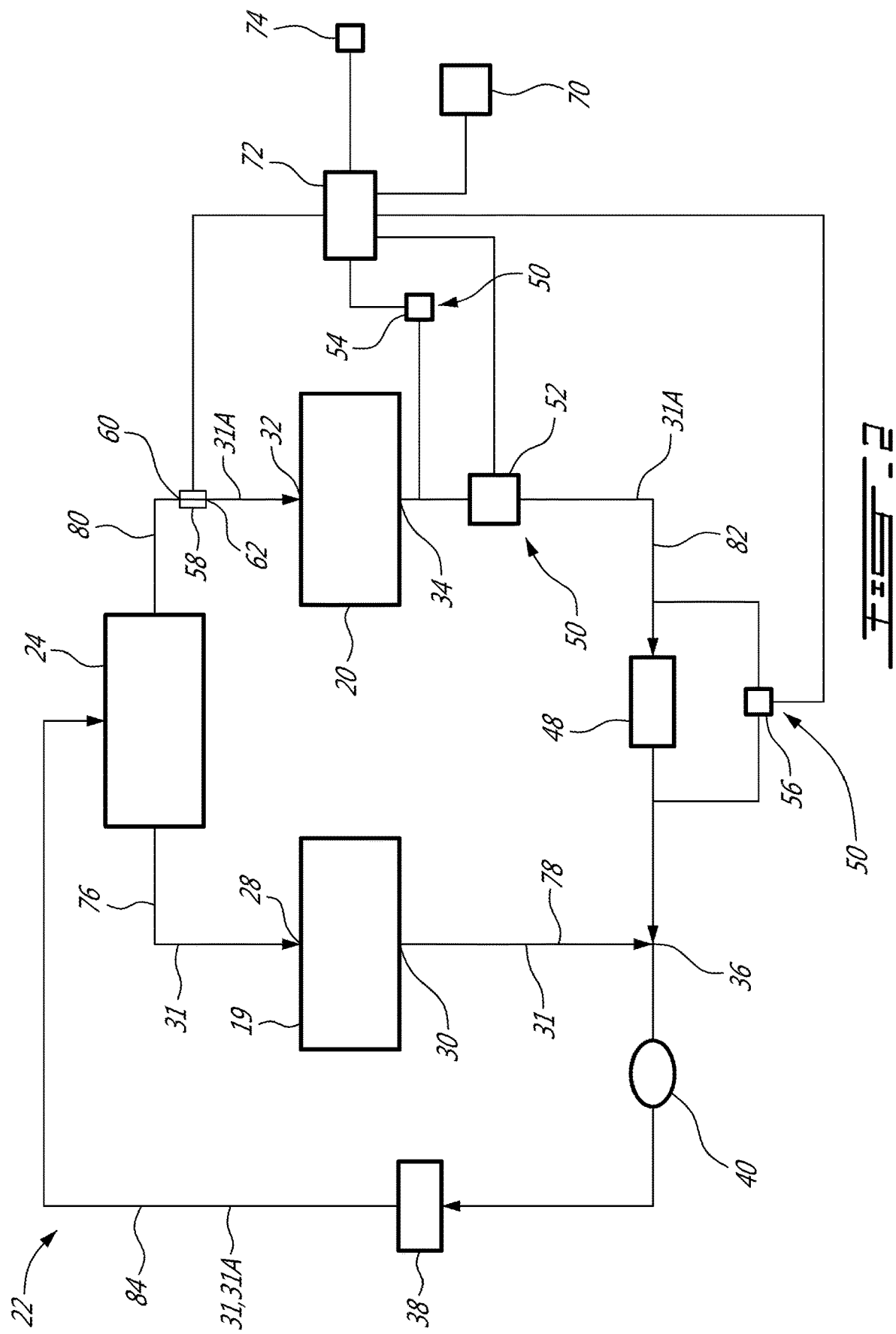
FIG. 2 is a schematic cross-sectional view of an oil system according to an embodiment of the present disclosure which may be used in the gas turbine engine of FIG. 1.

Referring to FIG. 2, a shared oil system 22 for providing a supply of oil to the gearbox 19 and the generator 20 is shown in accordance to a particular embodiment. It is understood that the term "oil" as used herein is intended to encompass any fluid suitable for cooling and/or lubricating the gearbox 19 (or any other engine component) and the generator 20 as it circulates therethrough. The oil system 22 includes an oil source 24 to provide a pressurized oil flow for the gearbox 19 and another pressurized oil flow for the generator 20. In a particular embodiment, the oil flows are pressurized at different pressures from one another. In operation, the oil system 22 circulates the oil through the gearbox 19 and the generator 20 from and to the oil source 24.

It is advantageous to detect any contaminant emanating from the generator 20 into the oil circulating therethrough to protect the gearbox 19 from such contaminant since the oil circulating through the generator 20 is redirected to the shared oil source 24. The contaminant can include impurities such as the debris released from the generator 20 or matter that renders the oil impure or unfit for the gearbox 19 and/or the generator 20. For example, debris such as metal chips or insulation material can be released into the oil circulating in the fluid circuit of the generator 20 if the generator 20 malfunctions. Therefore, in a particular embodiment, the oil system 22 is provided to maintain a flow of oil to the gearbox 19 and to selectively provide a flow of oil to the generator 20.

The oil system 22 includes an inlet 28 and an outlet 30 configured to communicate with the fluid circuit of the gearbox 19 such that the oil entering the inlet 28 circulates through the gearbox 19 before exiting through the outlet 30. An engine oil circulation path 31 is provided to circulate the oil between the oil source 24 and the gearbox 19. In the embodiment shown, the engine circulation path 31 defines a supply portion 76 defined between the oil source 24 and the inlet 28, to guide the oil flow into the gearbox 19, and a fluid communication return portion 78 between the outlet 30 and the oil source 24 to guide the oil flow back to the oil source 24. The circulation path 31 can include any duct, pipe, hose, channel, conduit, tube, or the like for conveying or directing the oil therethrough.

The oil system 22 also includes an inlet 32 and an outlet 34 configured to communicate with the fluid circuit of the generator 20 such that the oil entering this inlet 32 circulates through the generator 20 before exiting through the outlet 34. Another generator oil circulation path 31A is provided to circulate the oil between the oil source 24 and the generator 20. In the embodiment shown, the generator circulation path 31A defines a supply portion 80 defined between the oil source 24 and the generator inlet 32, to guide the oil into the generator 20, and a fluid communication return portion 82 between the generator outlet 34 and the oil source 24 to guide the oil back to the oil source 24. The circulation path 31A can include any duct, pipe, hose, channel, conduit, tube, or the like for conveying or directing the oil therethrough.

In the embodiment shown, the engine supply portion 76 is disposed in parallel with, or in other words independently from the generator supply portion 80. Parallel supply portions 76, 80 can include any configuration allowing blocking of the flow in one of the supply portions 76, 80 without preventing the flow in the other. In other words, the oil can flow from the oil source 24 to the gearbox 19 without flowing from the oil source 24 to the generator 20.

In the embodiment shown, the circulation paths 31, 31A are merged at an intersection point 36 downstream of the gearbox 19 and the generator 20 and upstream of the oil source 24. The merged circulation paths 31, 31A are guided to the oil source 24 through a common fluid path 84. The common fluid path 84 connects the fluid communication return portions 78, 82 to the oil source 24. The oil circulating downstream of the intersection point 36 is guided towards the shared oil source 24 through a shared filter 38. Another filter 48 is provided in the oil circulation path 31A between the generator outlet 34 and the intersection point 36. The filters 38, 48 can be any suitable device, material, and the like that are able to allow certain components of a mixture to pass through while retaining or deflecting other components. For example, the filters 38, 48 may comprise a mesh with pores sized to allow the oil to pass through, while retaining the contaminant, such as the debris.

The oil system 22 also includes one or more pumps 40 (one in the embodiment shown, suitable when the same oil pressure is required in both systems) for circulating and conveying the oil through the circulation paths 31, 31A. The pump 40 can be any suitable device that can be used to increase a flow rate or pressure of the oil in one or both circulation paths 31, 31A. For example, the pump 40 can be a vane pump or the like. In the embodiment shown, the pump 40 is disposed in the merged circulation paths 31, 31A between the intersection point 36 and the oil source 24 through the common fluid path 84.

The oil system 22 also includes one or more detector(s) 50 for measuring a parameter indicative of the contaminant in the oil flow exiting the generator 20. The parameter can include a resistance from a sensor, a temperature of the oil flow and/or a pressure of the oil flow, or any other parameter that can be used to directly detect the contaminant or detect a change in the oil flow indicative of the presence of the contaminant. Accordingly, the detector 50 can be any suitable measuring device, such as an electrical measurement device, a thermocouple, a differential pressure sensor, an optical measurement device, and the like, for measuring the parameter in the oil flow and sending a signal and/or a value indicative of the measurement. The detector 50 is disposed downstream of the generator 20 in the generator circulation path 31A between the generator outlet 34 and the intersection point 36 for detecting the contaminant in the oil flow exiting the generator 20.

In the embodiment shown, the detectors 50 include a chip detector 52 disposed in the generator circulation path 31A between the generator outlet 34 and the intersection point 36. For example, the change in resistance of the chip detector 52 can indicate the possible release of metallic debris from the generator 20. Other types of detectors can monitor the solid contents of the oil passing the detector which can be used to detect malfunction of the generator 20.

In the embodiment shown, the detectors 50 also include a temperature sensor 54 measuring a temperature of the oil flow in the generator circulation path 31A downstream of the generator outlet 34 between the generator 20 and the intersection point 36. It may be advantageous to locate the temperature sensor 54 in proximity of the generator outlet 34 to measure the temperature of the oil flow as it exits the generator 20 away from other heat sources and/or heat sinks and therefore improve the accuracy of the contaminant detection. The temperature of the oil circulating in the generator circulation path 31A may increase as a result of the generator malfunction.

The detectors 50 also include a differential pressure sensor 56 connected to the generator circulation path 31A across the generator filter 48 to measure a pressure upstream of the generator filter 48 and a pressure downstream of the generator filter 48 in order to provide a measurement of a differential pressure of the oil across the generator filter 48. Since the contaminant can block or partially block the generator filter 48, the pressure across the generator filter 48 can increase due to flow restrictions caused by the blockage of the generator filter 48 caused by the contaminant. For example, accumulation of the contaminant can reduce a cross-sectional flow area of the oil flow within the generator circulation path 31A.

Although three detectors 50 have been shown, it is understood that any single detector 50 or any combination of detectors 50 can alternately be used.

The oil system 22 includes a valve 58 to reduce the oil flow from the oil source 24 to the generator 20 without reducing the oil flow form the oil source 24 to the gearbox 19. In the embodiment shown, the valve 58 is disposed in the generator circulation path 31A between the oil source 24 and the inlet 32. The valve 58 can be any suitable flow regulating device, such as a device or system than can reduce, control, prevent or inhibit the flow of oil through a fluid passageway thereof. It is understood that the terms "reduce", "reducing" and similar include diminishing the oil flow up to, and including, substantially or totally blocking the oil flow from the oil source 24 to the generator 20.

In the embodiment shown, the valve 58 has a valve inlet 60 and a valve outlet 62 in fluid communication with the generator circulation path 31A. The valve inlet 60 is in fluid communication with the oil source 24 to receive the oil and the valve outlet 62 is in fluid communication with the first inlet 32 of the generator 20 to selectively supply the generator 20 with the oil. In order to reduce (e.g., block) the oil flow from the oil source 24 to the generator 20, the valve 58 can be actuated to block the valve outlet 62. For example, the valve 58 can include a gate (not shown) which can be moved in a position to block a fluid passageway through the valve outlet 62. When the valve outlet 62 is blocked, the pump 40 continues to receive oil from the oil source 24 through the engine circulation path 31.

The oil system 22 also includes a control system 72 that is connected to, and communicates with, the detector(s) 50 to receive the measured value of each measured parameter. The control system 72 is configured to compare the measured value with a corresponding threshold, which can be for example an upper acceptable level of the measured value. Thus, detection of the contaminant in the oil flow can occur if the measured value exceeds the threshold. After detection of the contaminant in the oil, for example when the measured value exceeds the corresponding threshold, the control system 72 sends a command signal to the valve 58 to actuate the valve 58 to reduce (e.g., interrupt) the oil flow from the oil source 24 to the generator 20. The control system 72 can also send a warning signal indicative of the contaminant in the oil flow exiting the generator 20 and can include visual and/or audio signals 74. In use, after the contaminant is detected in the oil flow exiting the generator 20, the oil system 22 can thus reduce the oil flow from the oil source 24 to the generator 20 via the valve 58.

For example, the detection of the contaminant may be achieved by comparing the measured resistance of the chip detector 52 with a predetermined threshold value indicating that metallic debris has been detected. The detection of the contaminant may also be achieved by comparing the temperature of the oil exiting the generator 20 with a predetermined threshold temperature, optionally in conjunction with the electrical loading of the generator 20. The detection of the contaminant may also be achieved by comparing the differential pressure measured across the generator filter 48 with a threshold value of delta pressure ($\Delta P$) which refers to a predetermined differential pressure representing an acceptable pressure drop across the generator filter 48. If the measured value is greater than the predetermined threshold value, the control system 72 sends the command signal to indicate the presence of the contaminant in the oil flow.

The oil system 22 also includes a user input device 70 for receiving instructions from a user, for example the aircraft pilot. The user input device 70 can include any suitable transducer such as a button, a touchpad and the like. For example, the user input device 70 can be part of a flight instrument of the aircraft. In operation, the user input device 70 receives a user input from the user, which can be received through direct physical manipulation, and converts the user input into a corresponding user generated signal. The control system 72 is connected to, and communicates with, the user input device 70 so as to receive the user generated signal. The user can thus manually manipulate the user input device 70 upon reception of the warning indicating contamination so as to send the user generated signal to the control system 72, and the control system 72 sends the command signal to actuate the valve 58 upon reception of the user generated signal from the user input device 70.

In addition or alternately, the control system 72 may have the ability to automatically send the command signal to the valve 58 upon detection of the contaminant without requiring user input. In this embodiment, the ability of the control system 72 to send a warning signal may be omitted.

Figure 3:
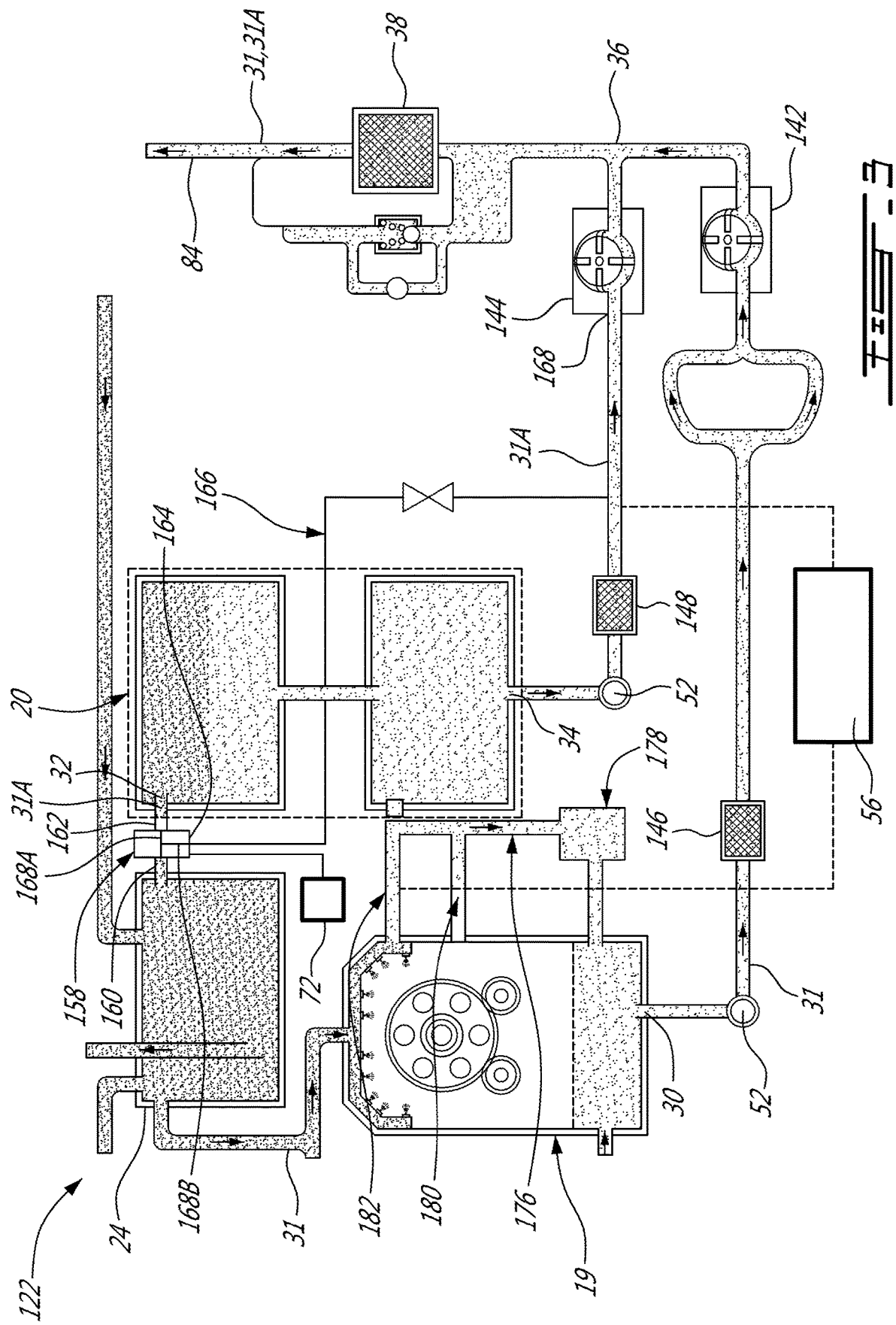
FIG. 3 is a schematic cross-sectional view of an oil system according to another embodiment of the present disclosure.

Referring to FIG. 3, a shared oil system 122 for providing a supply of oil to the gearbox 19 and the generator 20 is shown in accordance to an alternate embodiment wherein similar reference numerals have been employed to identify like features. In this embodiment, the oil system 122 includes two pumps 142, 144 each received in a respective one of the circulation paths 31, 31A, allowing different oil pressures in the two circulation paths 31, 31A. The first pump is an engine component pump 142 disposed in the engine circulation path 31 downstream of the gearbox 19 and upstream of the intersection point 36 and, the second pump is a generator pump 144 disposed in the generator circulation path 31A downstream of the generator 20 and upstream of the intersection point 36. Additional pumps may be added to the oil system 122, as needed. Filters 146, 148 are provided upstream of the pumps 142, 144 to block and/or capture contaminants that may be circulating in the oil exiting the gearbox 19 and the generator 20. The engine component filter 146 is disposed downstream of the outlet 30 of the gearbox 19 and upstream of the engine component pump 142 and the generator filter 148 is disposed downstream of the outlet 34 of the generator 20 and upstream of the generator pump 144.

The oil system 122 also includes a valve 158 to reduce (e.g., block) the oil flow from the oil source 24 to the generator 20. In the embodiment shown, the valve 158 is disposed in the generator circulation path 31A between the oil source 24 and the generator inlet 32. The valve 158 can be any suitable flow regulating device, such as a device or system than can reduce or control the flow of oil through a fluid passageway thereof. The valve 158 has a valve inlet 158, and two valve outlets 162, 164. The valve inlet 160 is in fluid communication with the oil source 24 to receive the oil and the first valve outlet 162 is in fluid communication with the inlet 32 of the generator 20 to selectively supply the generator 20 with the oil.

The oil system 122 also includes a bypass line 166 in fluid communication with the other valve outlet 164 and with an inlet 168 of the generator pump 144. In the embodiment shown, the bypass line 166 fluidly connects the valve 158 and the circulation path 31A upstream of the generator pump 144 and downstream of the generator filter 148, so as to be able to supply the generator pump 144 with the oil when the generator 20 is no longer supplied with oil from the oil source 24. In a particular embodiment, the valve 158 includes a fluid passage 168A between the valve inlet 160 and the valve outlet 162 communicating with the generator 20, and another fluid passage 168B between the valve inlet 160 and the valve outlet 164 communicating with the pump 144. Thus, the valve 158 can be actuated to provide selective fluid communication between the valve inlet 160 and each of the valve outlets 162, 164 via the fluid passages 168A, 168B upon receipt of the command signal from the control system 72. Advantageously, if the generator 20 malfunctions and/or starts to emit contaminants into the oil circulating therethrough, the oil flow from the oil source 24 to the generator 20 can be reduced and redirected to maintain an oil flow through the generator pump 144, which in a particular embodiment is a vane pump.

In the embodiment shown, the oil system 122 also includes a primary overflow line 176 connecting the generator 20 to the gearbox 19. The primary line 176 provides make-up air to the generator 20 during normal operation of the engine 10 to support the generator 20 scavenging functions. In addition, it provides an alternate oil return path to the oil source 24 upon partial or complete blockage of the generator filter 148. A primary overflow line filter 178 is disposed in the primary overflow line 176 to capture contaminants which may be released from the generator 20 via the primary line 176. A secondary overflow line 180 connects the primary line 176 to the gearbox 19 upstream of the primary line filter 178. The secondary line 180 provides a secondary alternate oil return path in an event of partial restriction or blockage of the primary overflow line filter 178.

In the embodiment shown, the oil system 122 also includes a vent line 182 operatively connected between the generator 20 and the gearbox 19 to provide an air connection between the generator 20 and the gearbox 19.

In use and in accordance with a particular embodiment, the oil is distributed by directing the oil flow from the oil source 24 to the gearbox 19 and back to the oil source 24 and directing the oil flow from the oil source 24 to the generator 20 and back to the oil source 24 to cool and/or lubricate the gearbox 19 and the generator 20.

A parameter of the oil flow downstream of the generator 20 and upstream of the oil source 24, i.e. of the flow exiting the generator 20 and being circulated back to the oil source 24, is monitored. In a particular embodiment, monitoring the parameter includes measuring the differential pressure across the generator filter 48, 148. In an alternate embodiment, monitoring the parameter includes measuring an electrical signal, such as the resistance of the chip detector 52 in the flow exiting the generator 20. In an alternate embodiment, monitoring the parameter includes measuring the temperature of the oil flow exiting the generator 20.

A contaminant in the oil flow is detected based on the parameter, for example by comparing the measured differential pressure to the predetermined pressure threshold, comparing the measured electrical signal to the predetermined electrical signal value threshold, and/or comparing the measured temperature to the predetermined temperature threshold.

The oil flow to the generator 20 from the oil source 24 is reduced after the contaminant is detected without reducing the oil flow from the oil source 24 to the gearbox 19. The oil flow can be automatically reduced upon detection of the contaminant, or be reduced upon reception of a user input after the user is warned of the presence of the contaminant. The oil flow can be directed from the oil source 24 to the inlet 168 of the generator pump 144 while bypassing the generator 20 through the bypass line 166. In a particular embodiment, the load on the generator 20 is reduced or eliminated before the oil flow to the generator 20 is reduced.

The above description is meant to be exemplary only, and one skilled in the art will recognize that changes may be made to the embodiments described without departing from the scope of the invention disclosed. For example, although the engine component connected to the system has been described as gearbox 19, it is understood that any other engine component requiring cooling and/or lubrication can alternately be used. Still other modifications which fall within the scope of the present invention will be apparent to those skilled in the art, in light of a review of this disclosure, and such modifications are intended to fall within the appended claims.

The invention claimed is:

1. A method of distributing oil within a gas turbine engine, the method comprising:
   directing a first oil flow from an oil source to an engine component of the gas turbine engine and back to the oil source;
   directing a second oil flow from the oil source to a generator driven by the gas turbine engine and back to the oil source;
   monitoring a parameter of the second oil flow downstream of the generator and upstream of the oil source;
   detecting a contaminant in the second oil flow based on the parameter; and
   reducing the second oil flow to the generator without reducing the first oil flow to the engine component when the contaminant is detected.

2. The method as defined in claim 1, wherein directing the first oil flow from the oil source to the engine component and directing the second oil flow from the oil source to the generator are performed in parallel.

3. The method as defined in claim 2, wherein directing the first oil flow from the engine component back to the oil source and directing the second oil flow from the generator back to the oil source are performed through a common fluid path.

4. The method as defined in claim 1, further comprising generating a warning signal upon detection of the contaminant.

5. The method as defined in claim 1, wherein reducing the second oil flow includes completely blocking the second oil flow to the generator.

6. The method as defined in claim 1, wherein monitoring the parameter includes measuring a differential pressure across a filter through which the second oil flow circulates downstream of the generator and detecting the contaminant includes comparing the measured differential pressure to a predetermined pressure threshold.

7. The method as defined in claim 1, wherein monitoring the parameter includes measuring a resistance of a sensor of the second oil flow exiting the generator, and detecting the contaminant includes comparing the resistance to a threshold value.

8. The method as defined in claim 1, wherein monitoring the parameter includes measuring a temperature of the second oil flow downstream of the generator, and detecting the contaminant includes comparing the measured temperature to a predetermined temperature threshold.

9. The method as defined in claim 1, wherein reducing the second oil flow is performed automatically upon detection of the contaminant.

* * * * *